United States Patent [19]
Banker et al.

[11] 4,089,025
[45] May 9, 1978

[54] VIR SIGNAL DETECTOR FOR A COLOR TELEVISION RECEIVER

[75] Inventors: Robert O. Banker; Charles T. Brown, both of Portsmouth; Sanjar Ghaem-maghami, Chesapeake; Howard E. Holshouser; Kenneth J. Wachter, both of Suffolk, all of Va.

[73] Assignee: General Electric Company, Portsmouth, Va.

[21] Appl. No.: 730,238

[22] Filed: Oct. 6, 1976

[51] Int. Cl.$^2$ .................... H04N 9/62; H04N 9/535
[52] U.S. Cl. ........................................ 358/10; 358/28
[58] Field of Search ........................... 358/10, 28, 139

[56] References Cited
U.S. PATENT DOCUMENTS

| | | | |
|---|---|---|---|
| 3,755,617 | 8/1973 | Ichida | 358/28 |
| 3,867,010 | 2/1975 | Rzeszewski | 358/10 |
| 3,950,780 | 4/1976 | Freestone | 358/28 |

*Primary Examiner*—Robert L. Griffin
*Assistant Examiner*—Aristotelis M. Psitos

[57] ABSTRACT

A VIR signal detector circuit for a color television receiver identifies the repetitive reception of a VIR color information signal on a predetermined horizontal line of video signal. The detection is accomplished with minimum interference from Gaussian and pulse-type noise to assure that VIR color control circuits in the receiver are activated only upon receipt of an actual VIR signal. The VIR signal detector operates by generating a viewing pulse of short duration during each horizontal line in which a VIR signal may be present. An accumulator, set to respond to a predetermined number of simultaneous detections of the viewing pulse and a video signal exceeding a predetermined value, generates a control signal indicating that a VIR signal is being received.

9 Claims, 7 Drawing Figures

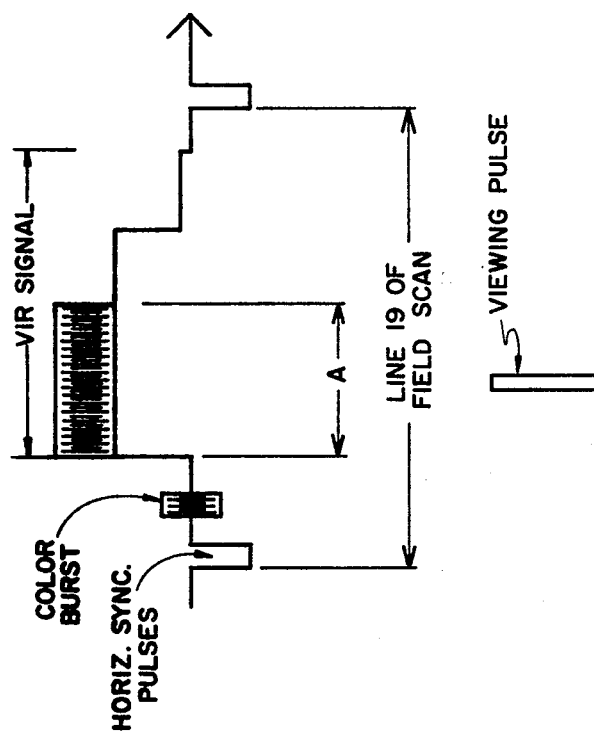
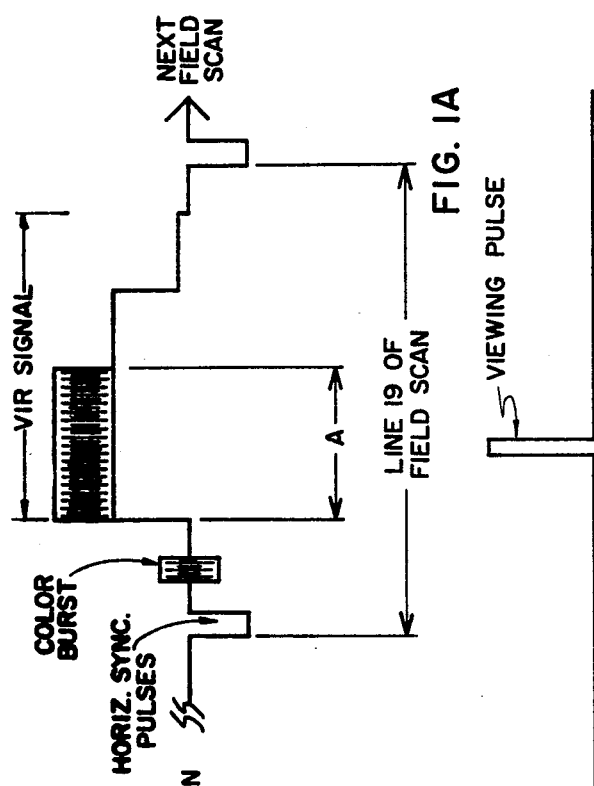
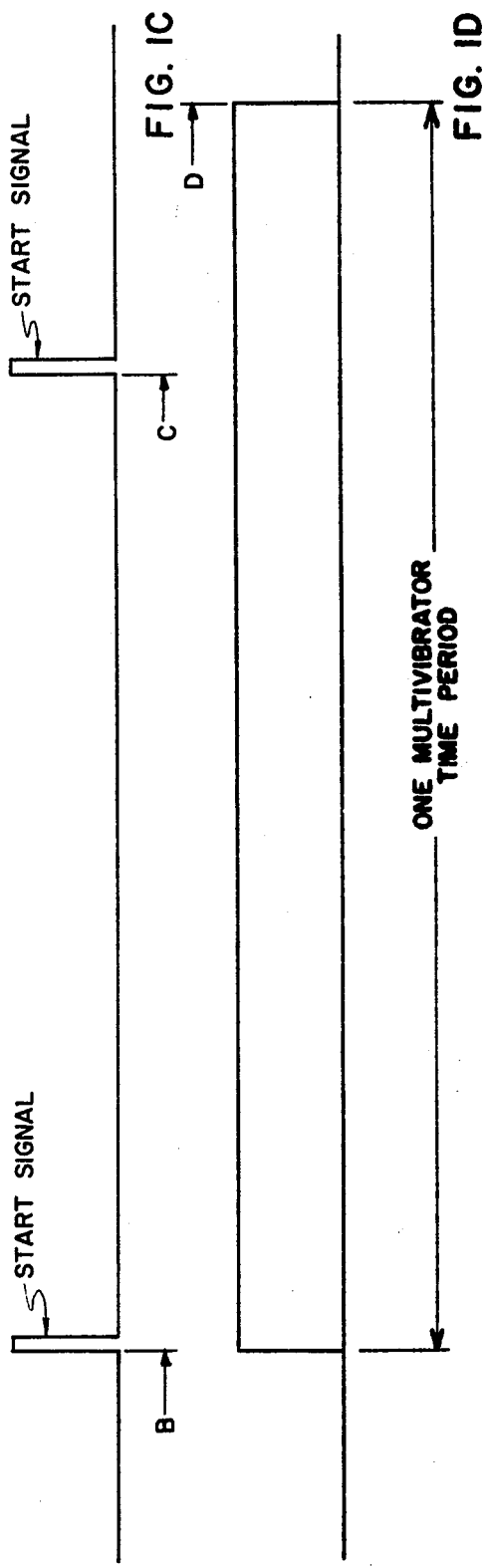

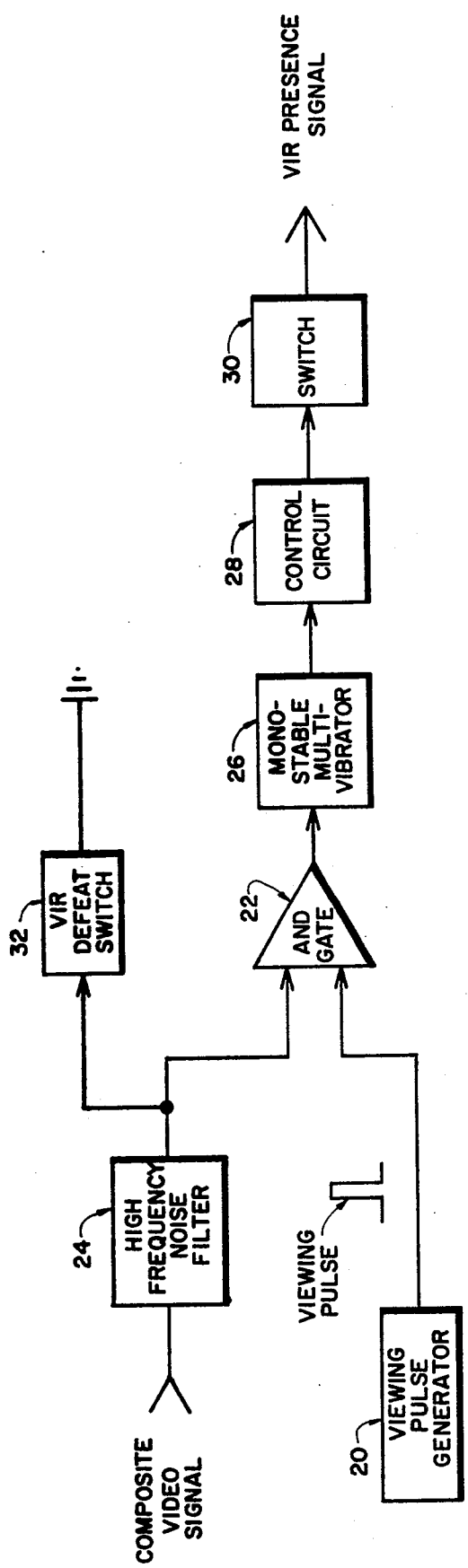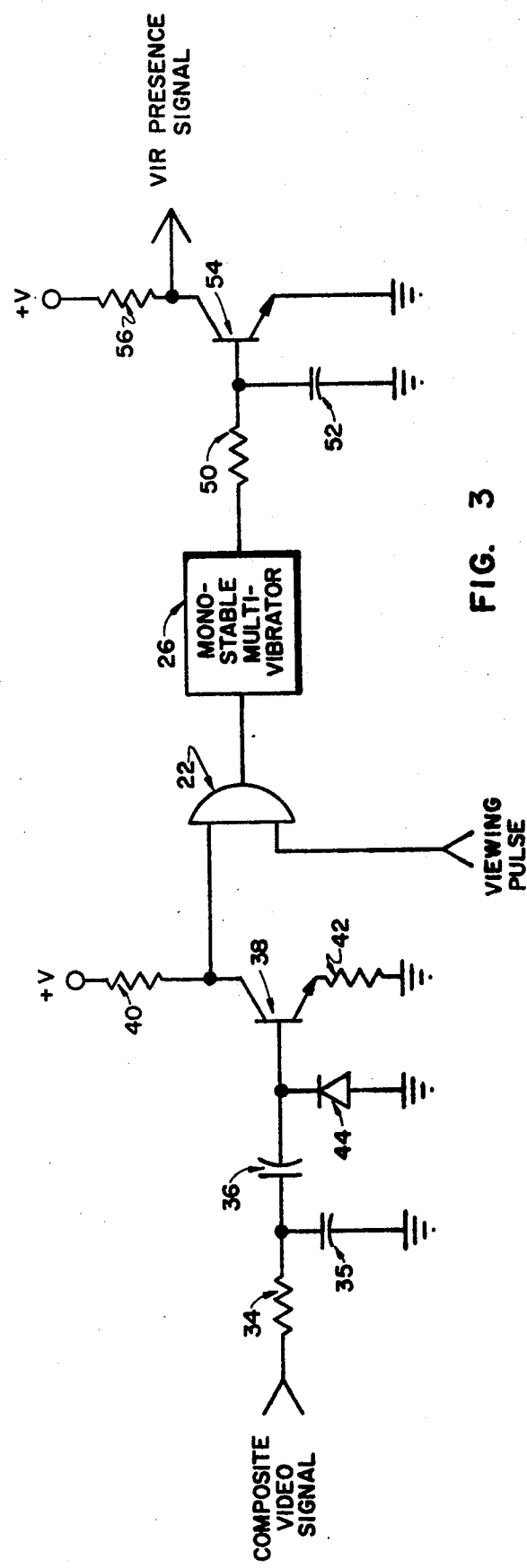

VIR SIGNAL DETECTOR FOR A COLOR TELEVISION RECEIVER

BACKGROUND OF THE INVENTION

The present invention relates to a VIR signal detector for a color television receiver wherein hue and chroma gain settings are automatically obtained by use of a vertical interval reference (VIR) signal received on line 19 of a video signal. More particularly, the invention relates to a VIR signal detector for a color television receiver which identifies the reception of a VIR signal with minimum interference from Gaussian and pulse-type noise. Upon detection of a VIR signal, the color television may be automatically switched from manual to VIR signal controlled color tuning. Also, upon loss of the presence of a VIR signal for a sufficient period of time, the receiver is automtically switched into the manual mode of color tuning.

U.S. copending patent application Ser. No. 663,483, VIR Automtic Hue Control with Preference Capability, filed Mar. 3, 1976 by Charles T. Brown et al and U.S. copending patent application Ser. No. 726,182, Chroma Preference Control for VIR Automatic Operation filed Sept. 24, 1976, by Robert O. Banker et al, both assigned to the assignee of the present application, describe circuits for automatically adjusting the color controls of a television receiver using information contained in a transmitted VIR signal.

In both the Brown et al and Banker et al applications a switch is provided to activate the VIR color controls only when a VIR signal is being received in each consecutive line 19 of a video signal. One method by which this switch might be operated is to simply detect the presence of a signal during line 19. The difficulty with this simple form of VIR signal detection is that Gaussian and pulse-type noise present during line 19 could erroneously trigger activation of the VIR color controls.

It is accordingly an object of the present invention to provide a circuit for detecting the presence of a VIR signal in a received video signal.

Another object of the present invention is to provide a VIR signal detector which discriminates against Gaussian and pulse-type noise.

A further object is to provide a VIR signal detector that differentiates between Gaussian and pulse-type noise and the VIR signal to shift receiver color tuning between manual and automatic modes of operation.

SUMMARY OF THE INVENTION

To achieve the foregoing objects of and in accordance with the purposes of the invention as embodied and broadly described herein, the VIR signal detector of this invention comprises a pulse generator for supplying a viewing pulse during each predetermined line of a video signal in which a VIR signal may be present. The viewing pulse is selected to have a duration which is substantially less than the duration of a VIR signal, for example, about 10 to 15 microseconds. In a preferred embodment of the invention, an AND gate provides a start signal upon the simultaneous detection of the viewing pulse and a noise-filtered composite video signal which exceeds a threshold value representative of the presence of a VIR signal. Each start signal from the AND gate activates a monostable multivibrator for a period of time greater than one half of a field scan and preferably greater than one but less than two field scans of the video signal. A control circuit coupled to the multivibrator generates a control signal in response to the continuous activation of the multivibrator by the consecutive presence of start signals for a selective number of field scans. In a preferred embodiment, this control circuit comprises a capacitor charging circuit in which a capacitor is charged to a preselected value upon the continuous activation of the multivibrator for a selective number of field scans and the control signal is generated when the charge in the capacitor reaches that value.

In another embodiment of the invention digital circuitry is employed as the accumulator of the predetermined number of field scans with the VIR signal present. An up/down counter replaces the multivibrator and control circuit and an appropriately gated flip-flop becomes the switch for generating the VIR control signal.

By limiting the duration of a viewing pulse to substantially less than the duration of a VIR signal, by requiring a detected signal above a predetermined minimum to trigger the AND gate, and by only responding to a preselected number of field scans, the VIR signal detector is highly immune to Gaussian and pulse-type noise to provide a control signal which automatically indicates the reception of a VIR signal.

A greater appreciation of the objects and advantages of the invention may be understood by a detailed description taken in conjunction with the drawings, wherein:

FIG. 1A is a representation of a portion of a composite video signal;

FIG. 1B is a representation of viewing pulses generated for use in one embodiment of the present invention;

FIG. 1C is a representation of start signals generated in accordance with one embodiment of the present invention;

FIG. 1D is a representation of multivibrator activation in accordance with one embodiment of the present invention;

FIG. 2 is a block diagram of a VIR signal detector circuit in accordance with a peferred embodiment of the present invention;

FIG. 3 is a circuit diagram of one embodiment of the VIR signal detector circuit disclosed in FIG. 2.

DETAILED DESCRIPTION

Figure 4:
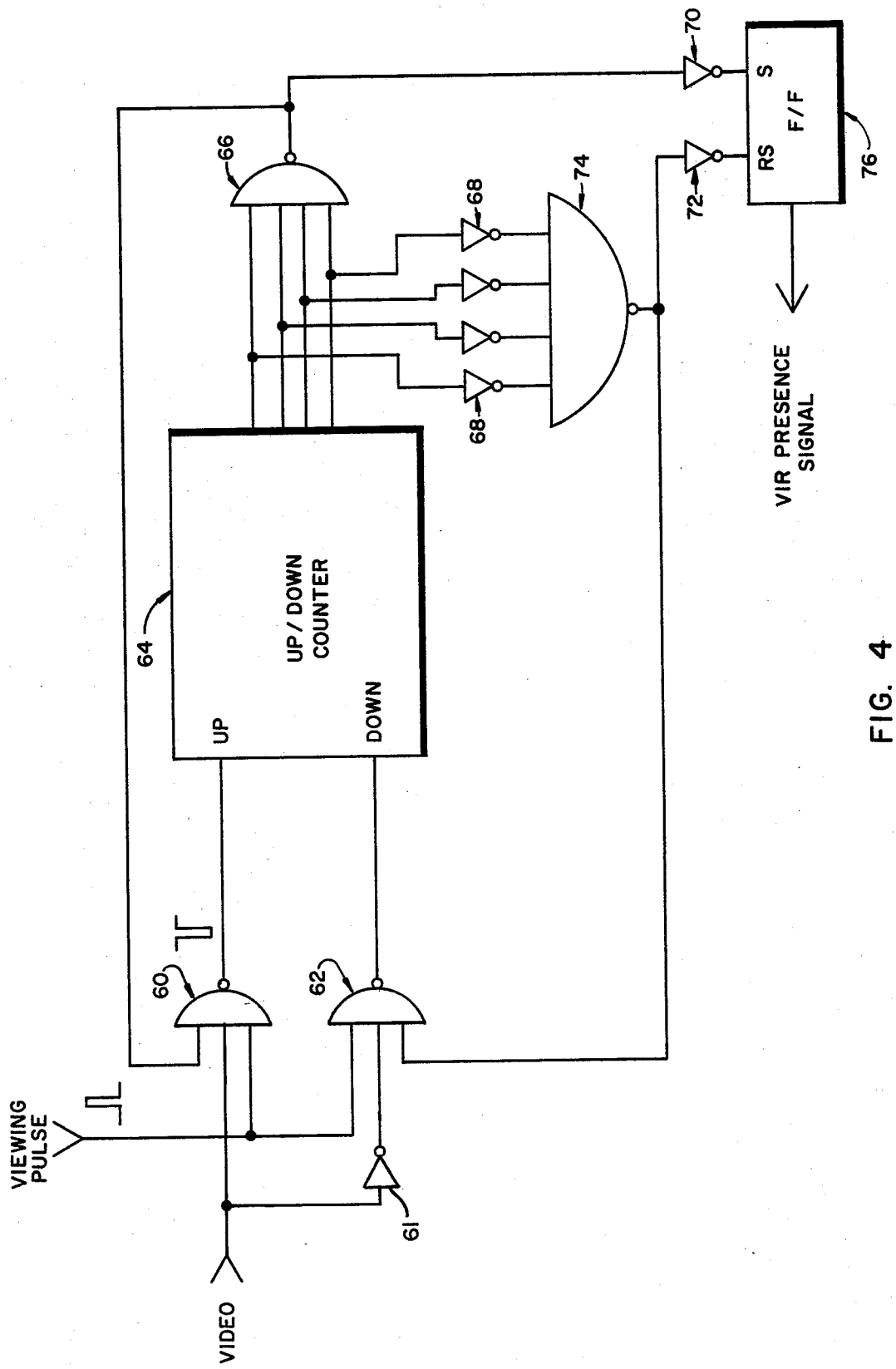
FIG. 4 is a block diagram of another embodiment of a VIR signal detector circuit in accordance with the present invention.

Reference will now be made in detail to the present preferred embodiment of the invention, an example of which is illustrated in the accompanying drawings.

Referring first to FIG. 1A, there is illustrated a portion of a color television composite video signal containing a VIR signal. Although the VIR signal could theoretically appear on any predetermined unused horizontal line, the Federal Communications Commission has reserved line 19 of each video field scan for use of a VIR signal; line 19 being one of several unused horizontal lines of the vertical blanking interval of each field scan. As illustrated in FIG. 1A, the VIR signal appears on line 19 of each field scan.

Turning to FIG. 2, the present invention employs a viewing pulse generator 20 for generating a viewing pulse during the portion of each predetermined line of composite video signal in which VIR signal may be present. In FIG. 1A, for example, such a portion is preferably the chrominance reference portion of the VIR signal, identified as time portion A. A viewing pulse during each time portion A is illustrated in FIG. 1B.

Viewing pulse generator 20 may, for example, comprise the circuitry described in U.S. Pat. No. 3,989,891 filed Sept. 24, 1974 by Harry T. Freestone and assigned to the assignee of the present application. In the Freestone patent, an output multivibrator supplies a pulse for the duration of a selected horizontal line, i.e., line 19. As explained by Freestone, this pulse may be used for the activation of circuitry in a color television receiver which responds to a VIR signal contained in line 19.

In accordance with the present invention, the viewing pulse generated by viewing pulse generator 20 has a duration substantially less than the duration of a VIR signal. When using the teachings of the Freestone Patent, the duration of the viewing pulse is controlled by the values of the components making up the disclosed output multivibrator as is well known to those skilled in the art. In addition, the resultant short duration time pulse can be located in any portion of line 19 by the use of delay circuits well known to those skilled in the art. With a standard line scan time of 63.5 microseconds, a viewing pulse duration of 10 to 15 microseconds occurring preferably during the chrominance reference portion or luminance portion of the VIR signal, as indicated in FIGS. 1A and 1B as occurring during period A of the VIR signal, is preferred. As will be discussed below, it is desirable to keep the duration of the viewing pulse as short as possible. Of course, many alternatives to a multivibrator may be employed as the viewing pulse generator 20. Any device capable of being triggered on and off at and for a predetermined time, such as a counter, would be suitable.

Viewing pulse generator 20 is coupled to one input of AND gate circuit 22. A second input of AND gate circuit 22 is coupled to receive a composite video signal from the color television receiver, which signal has preferably first passed through high frequency noise filter 24. High frequency noise filter 24 may be of any variety known in the art capable of substantially stripping off Gaussian or "white" noise, or short duration noise on the composite video signal.

AND gate 22 circuit operates to deliver a start signal to monostable multivibrator 26 upon the simultaneous detection of a viewing pulse from viewing pulse generator 20 and a composite video signal exceeding a predetermined value. In the preferred embodiment, the composite video signal is first filtered by high frequency noise filter 24. The predetermined value which the filtered video signal must exceed to operate AND gate circuit 22 is selected to represent the presence of a VIR signal by being as large as possible to avoid having low level noise operate AND gate circuit 22 but yet small enough to assure that each VIR signal can operate AND gate circuit 22. Start signals from AND gate circuit 22 are illustrated in FIG. 1C.

It should be noted that since the video signal in the form of a VIR signal must be of sufficient amplitude to exceed the threshold of AND gate 22, the viewing pulse should occur during the higher amplitude portions of the VIR signal, namely the chrominance reference and luminance reference portions.

In accordance with the present invention, monostable multivibrator 26 is activated by each start signal from AND gate circuit 22 for a period of time preferably greater than one and less than two field scans of the composite video signal. Referring to FIGS. 1C and 1D, monostable multivibrator 26 is activated at time B by a first start signal. If no start signal were to occur at time C because of an absence of a VIR signal on line 19 of the field scan, multivibrator 26 would deactivate at time D which is greater than one but less than two field scans. However, an additional start signal at time C causes multivibrator 26 to remain activated through the next field scan.

Returning to FIG. 2, monostable multivibrator 26 is coupled to control circuit 28 which in turn is coupled to switch 30. Control circuit 28 keeps track of the number of consecutive field scans during which multivibrator 26 remains activated.

Once control circuit 28 indicates that multivibrator 26 has remained activated for a selected number of field scans, switch 30 is tripped to generate a control signal indicative of the presence of a VIR signal in the received composite video signal. Likewise, if control circuit 28 indicates that multivibrator 26 has been off for a predetermined number of field scans, switch 30 will turn off the VIR presence signal. Also, switch 30 may contain hysteresis such as in the form of a Schmidt trigger so that a first higher threshold is required to turn switch 30 on and a lower threshold is required to turn switch 30 off. In this manner the number of field scans indicated by control circuit 28 must rise above the first threshold of switch 30 in order for a VIR presence signal to be generated and momentary loss of the VIR signal such as by noise concellation during one or two field scans, for example, will not cause switch 30 to turn off so long as the momentary loss did not drop the level below the second threshold of switch 30.

In one preferred embodiment of the invention, control circuit 28 comprises a capacitor-charging circuit connected to charge when multivibrator 26 is activated and to discharge through the multivibrator 26 when multivibrator 26 is no longer activated due to the absence of a start signal during any field scan of the composite video signal. Switch 30 trips in response to the magnitude of the charge stored by the capacitor-charging circuit after continuous charging for a selected number of field scans. One specific embodiment of a capacitor-charging circuit suitable for use as control circuit 28 is illustrated in FIG. 3 and discussed below.

The selective number of field scans during which multivibrator 26 must remain active before control circuit 28 trips switch 30 must be great enough to assure that the start signals from AND gate circuit 22 are generated as a consequence of receiving a VIR signal and not as a consequence of receiving Gaussian and pulse-type noise. On occasion, noise of sufficient magnitude to activate AND gate circuit 22 might exist simultaneously with a viewing pulse. However, the probability that noise will consistently occur simultaneously with a viewing pulse decreases with the number of field scans involved. Experience indicates that adjusting control circuit 28 so that multivibrator 26 must remain activated continuously for 15 to 20 field scans before switch 30 is tripped provides a high immunity to erroneous tripping of switch 30 by Gaussian and pulse-type noise.

The probability that noise will consistently occur simultaneously with a viewing pulse also decreases as the duration of the viewing pulse decreases. Accordingly, the viewing pulse is of only sufficient duration to derive the start signals upon the simultaneous presence at AND gate circuit 22 of the viewing pulse and a VIR signal in the composite video signal.

In accordance with one embodiment of the present invention, a VIR defeat switch 32 is coupled between high frequency noise filter 24 and AND gate circuit 22. Defeat switch 32 is selectively operated to drain the composite video signal to ground and thus prevent operation of AND gate circuit 22. As an alternative, a defeat switch may be used to drain the viewing pulses from viewing pulse generator 20 to ground. Defeat switch 32 thus can prevent switch 30 from ever generating a control signal indicative of the presence of a VIR signal and thereby prevent operation of the VIR circuitry of a color television receiver.

The VIR signal detector has very high noise immunity for a number of reasons. First, to trigger a VIR control signal a noise pulse must be of sufficient duration to pass through high frequency noise filter 24. Second, a noise pulse must occur during the short time duration of the viewing pulse from viewing pulse generator 20 which represents a very small percent of the total frame scan. In addition, noise must be of sufficient magnitude to operate AND gate circuit 22. Thus, the probability of activating monostable multivibrator 26 by noise is very low. Third, even in the event noise content is sufficient to randomly turn monostable multivibrator 26 on and off, switch 30 will not be triggered to produce a VIR control signal because operation of control circuit 28 requires continuous activation of multivibrator 26 over a multiple number of consecutive field scans. In this manner the subject VIR signal detector is highly immune to Gaussian and pulse type noise as it automatically detects the presence of a VIR signal.

FIG. 3 is a circuit diagram of one preferred embodiment of the signal detector circuit disclosed by the block diagram of FIG. 2. A resistor 34 is coupled with a capacitor 35 to form a high frequency noise filter 24. Capacitor 36 blocks the DC component of the signal to allow transistor 38 to be biased at its base by clamp diode 44. Transistor 38 is further biased between a positive DC voltage supply and ground by resistors 40 and 42. Diode 44 is connected between the base of transistor 38 and ground so that the combined voltage drop across diode 44 and the base-emitter junction of transistor 38 must be exceeded before transistor 38 turns on. With one input terminal of AND gate 22 connected to the collector of transistor 38 and the other input terminal connected to receive a viewing pulse from viewing pulse generator 20 described above, the combined voltage drop across diode 44 and the base-emitter junction of transistor 30 established the predetermined value which a composite video signal filtered through resistor 34 and capacitor 35 must exceed to operate AND gate 22. As described above, this voltage drop is selected to represent the presence of a VIR signal.

The output of AND gate 22 is coupled to activate monostable multivibrator 26. The combination of AND gate 22 and monostable multivibrator 26 may, for example, comprise one half of a Texas Instruments, Inc. integrated circuit, part number SN74123.

The output of multivibrator 26 is coupled to a capacitor charging circuit comprising a resistor 50 and a capacitor 52. The capacitor-charging circuit is in turn coupled to a switch comprising transistor 54 biased by a DC supply voltage and a resistor 56.

In operation, capacitor 52 charges whenever multivibrator 26 is activated by AND gate 22 and discharges through multivibrator 26 whenever multivibrator 26 is not activated by AND gate 22. Transistor 54 is biased to turn on only after the charge on capacitor 52 has built up over a selected number of field scans. Thus, while Gaussian and pulse-type noise might occasionally operate AND gate 22, only a VIR signal on each line 19 for the selected number of field scans will trigger a control signal from transistor 54.

It should be noted that different modes of operation of multivibrator 26 and capacitor 52 are possible. Thus, the ON period of the multivibrator has been set forth as being preferably greater than one field scan and less than two. Such operation is based on the desire to hold the multivibrator in the On state as long as start signals are received from AND gate 22. This enables capacitor 52 to be continuously charged since before the multivibrator can turn off the next start pulse appears, and yet the multivibrator turns off soon enough so that the capacitor discharge begins at the first field scan where VIR presence is not detected.

Assuming substantially equal charge and discharge rates for capacitor 52 (and different charge and discharge rates can be employed depending upon the operation desired), multivibrator 26 need only be ON for a period greater than one half of a field scan if the affect on capacitor 52 is continued charging during the continued presence of a VIR signal. Also, it is not critical, only desirable that the ON period of the multivibrator be less than two field scans. If the ON period is greater than two field scans, the system is merely less responsive. In general, the multivibrator-capacitor combination is merely one of several means of accumulating and recognizing successive identifications of the presence of the VIR signal. Other means, such as the digital circuitry of FIG. 4, can be readily employed.

Turning now to FIG. 4, there is shown an alternative embodiment of the means for accumulating successive identifications of the presence of the VIR signal in the form of an appropriately gated up/down counter and a flip-flop to generate the VIR presence indicating signal when the VIR signal is present for the predetermined number of field scans. In this figure the viewing pulse is shown being applied to two NAND gates 60 and 62, NAND gate 60 providing substantially the same function as provided by AND gate 22. NAND gate 60 responds also to the presence of video above the threshold established by this gate and to the absence of an inhibit pulse from NAND gate 66. Thus, when all inputs to NAND gate 60 are positive, negative going pulses coincident with the viewing pulses will appear at the up input of UP/DOWN counter 64. Successive up inputs until a predetermined count is reached, 15 for example, will produce a triggering output through NAND gate 66 and inverter 70 to the SET input of flip-flop 76. In this state, flip-flop 76 generates a VIR presence signal. The 1111 output of counter 64 when a count of 15 is reached produces a 0 input to NAND gate 60 from NAND gate 66 to hold the counter at count 15, indicating the presence of a VIR signal so long as VIR signal presence indications are received during each field scan.

NAND gate 62 responds to the absence of a VIR signal via inverter 61 by producing pulses coincident with the viewing pulses that cause counter 64 to count down. A net of down inputs (noise that does get through could cause the counter to count up) until a predetermined count, zero for example, will produce an output from NAND gate 74 by way of inverters 68 and 72 to the reset input of flip-flop 76 to cause the VIR presence signal to be turned off. The 0000 output from counter 64 when the count of zero is reached also provides a zero input to NAND gate 62 to inhibit this NAND gate from further responding to VIR absence indications so that counter 64 will remain at count zero until a presence indication is received.

It should be noted that the counter need not be set to count down to zero before flip-flop 76 is reset to a non VIR or manual color tuning mode. Any count less than 15 could be used to trigger the reset condition.

While particular embodiments of the present invention have been shown and described, it will of course be obvious to one skilled in the art that certain advantages and modifications may be effected without departing from the spirit of the invention, and accordingly, it is intended that the scope of the invention not be determined by the foregoing examples but only by the scope of the appended claims.

What is claimed and desired to be secured by Letters Patent of United States is:

1. In a color television receiver a VIR signal detector for identifying the presence of a VIR signal in a predetermined line of each field scan of the composite video signal, said signal detector having high immunity to Gaussian and pulse-type noise in said composite video signal, said signal detector comprising:
    means for generating a viewing pulse during the portion of each predetermined line of a composite video signal in which a VIR signal may be present, said viewing pulse having a duration less than the duration of said VIR signal,
    means responsive to said viewing pulse and the video signal to provide a presence indication upon simultaneous detection of said viewing pulse and a video signal exceeding a predetermined value, and
    means for accumulating said presence indications and generating a VIR presence signal upon the accumulation of a predetermined number of presence indications.

2. The invention recited in claim 1, wherein said means for accumulating, upon accumulating a predetermined number of presence indications, is responsive to indications of the absence of said video signal during the period of said viewing pulse to stop generating said VIR presence signal upon the receipt of a predetermined number of absence indications.

3. The invention recited in claim 1 wherein said means responsive to said viewing pulse and said video signal comprises an AND gate,
    said AND gate including threshold means responsive to said video signal when the level of said video signal exceeds the level determined by said threshold means.

4. The invention recited in claim 3 further comprising a high frequency noise filter coupled to operate on said composite video signal before said video signal is detected by said AND gate.

5. The invention recited in claim 1 wherein said means for accumulating comprise a monostable multivibrator, storage means and switch means,
    said multivibrator being responsive to said presence indications to be activated thereby,
    said storage means being responsive to the activation of said multivibrator to register an accumulation of activations until a predetermined level is reached, and
    said switch means responding to the accumulation of said storage means to be activated in response to said predetermined level of activations to provide said VIR presence signal.

6. The invention recited in claim 5 wherein said storage means comprises a capacitor charging circuit and said multivibrator has an activation period greater than one field scan and less than two field scans of said video signal so that said multivibrator is continuously activated when a presence indication is obtained during each of a series of consecutive field scans and said capacitor charging circuit is continuously charged,
    said switch means being activated when the charge on said capacitor charging circuit reaches said predetermined level.

7. The invention recited in claim 2 wherein said means responsive to said viewing pulses and to said video signal comprises AND gate means, and
    said means for accumulating comprises counting means and flip-flop means,
    said counting means counting each presence indication from said AND gate means until a predetermined count is reached, and
    said flip flop means being activated into a first state in response to said predetermined count to generate said VIR presence signal.

8. The invention recited in claim 7 further including logic means,
    said counting means being interconnected with said AND gate means and said flip-flop means by said logic means such that when said counting means reaches said predetermined count said AND gate means is inhibited by said logic means from receiving further presence indications and enabled by said logic means to respond to indications of an absence of said video signal during the period of said viewing pulse to provide absence indications,
    said counting means counting said absence indications until a second predetermined count is reached, and
    said flip-flop means being activated into a second state n response to said second predetermined count so that said VIR presence signal is not generated.

9. In a color television receiver, a VIR signal detector with immunity to Gaussian and pulse-type noise in a composite video signal for identifying the presence of a VIR signal in line (19) of each field scan of the composite video signal, said signal detector comprising:
    a pulse generator means for providing a viewing pulse during the portion of each line (19) of each field scan in which a VIR signal may be present, said viewing pulse having a time duration of about 10 to 15 microseconds;
    a high frequency noise filter;
    an AND gate circuit for deriving a start signal upon the simultaneous presence of said viewing pulse and a composite video signal having a magnitude after passing through said noise filter exceeding a preselected value,
    a monostable multivibrator coupled to said AND gate circuit to be activated for a time greater than one and less than two field scans of said video signal upon receipt of said start signal from said AND gate;
    a capacitor circuit charging upon activation of said multivibrator and discharging at all other times, said capacitor circuit charging to a certain value only after said multivibrator remains activated for a selected consecutive number of field scans; and
    means for generating a control signal in response to said charge upon said capacitor circuit exceeding said certain value.

* * * * *